Figure 1:
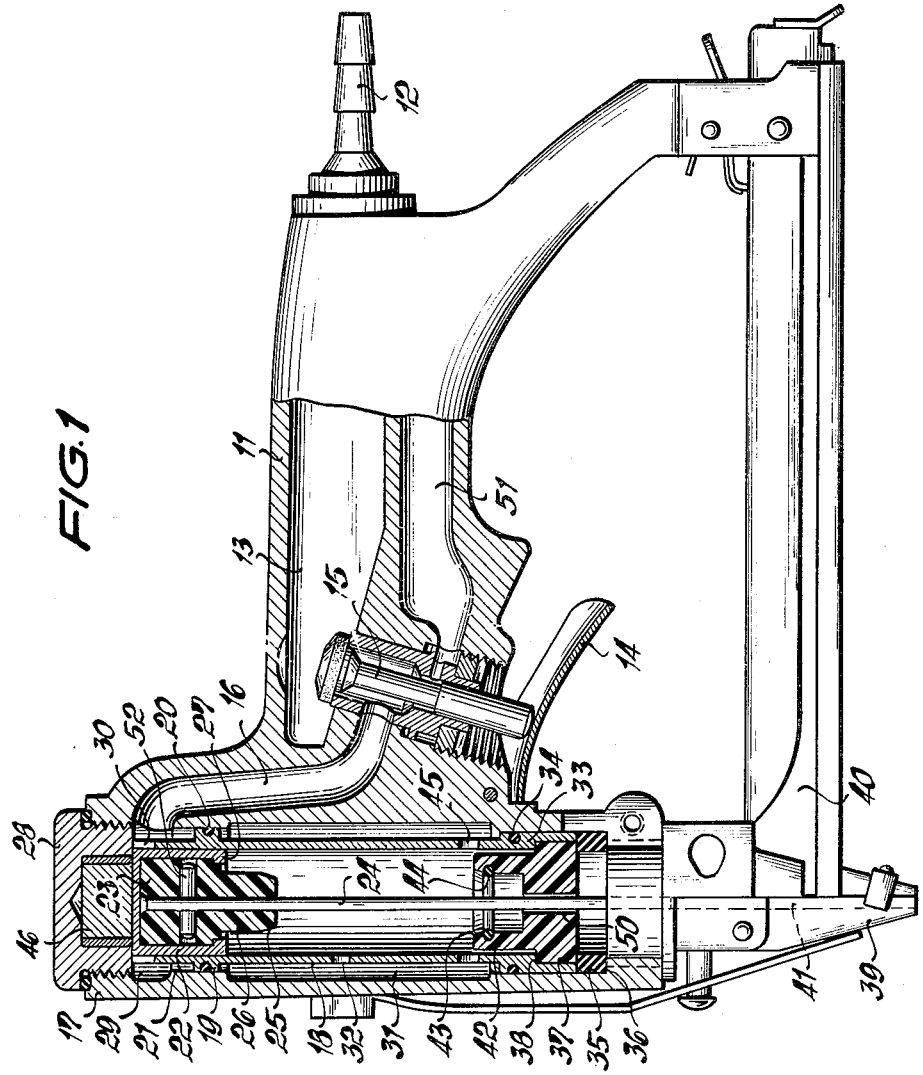

Sept. 14, 1965  D. VOLKMANN  3,205,787
PNEUMATIC AIR OPERATED FASTENER DRIVING DEVICE
Filed July 3, 1963  2 Sheets-Sheet 1

INVENTOR
D. Volkmann
BY
Richards & Geier
ATTORNEYS

Sept. 14, 1965     D. VOLKMANN     3,205,787
PNEUMATIC AIR OPERATED FASTENER DRIVING DEVICE
Filed July 3, 1963     2 Sheets-Sheet 2

INVENTOR
D. Volkmann
BY
Richards & Geier
ATTORNEYS

United States Patent Office 3,205,787
Patented Sept. 14, 1965

3,205,787
PNEUMATIC AIR OPERATED FASTENER
DRIVING DEVICE
Dieter Volkmann, Neustadt, Rubenberge, Germany,
assignor to Dieter Haubold, Hannover, Germany
Filed July 3, 1963, Ser. No. 292,535
Claims priority, application Germany, July 6, 1962,
H 46,313
1 Claim. (Cl. 91—399)

The present invention relates to a power operated device in which pneumatic power is used both to actuate a piston on a work performing stroke and also to return the piston in preparation for a succeeding stroke, and more particularly to a portable pneumatic fastener driving device, in which a piston and driver are air actuated to drive fasteners such as staples, wire nails, pins or tacks, and in which the driver and piston are returned without a driver return spring, all with the use of a minimum of air.

It has been the practice heretofore to employ fastener driving devices where the piston is returned into its initial position only after performance of a complete working stroke which requires the driver being connected to the piston, to fully drive the fastener into the work-piece. However, there are plenty of situations where the fastener is intended not to fully intrude into the work-piece as this is the case with staples for fixing springs of mattresses, upholstered seats etc. or with pins used for fastening of glass plates to windows, picture or any other frames. The prior art of fastener driving devices with pneumatic return of the piston is of not much avail in these cases as the working travel of the piston, in these constructions, cannot be limited to less than the complete stroke—which limitation would be necessary in order to only partially drive a fastener—and at the same time be returned into its initial position by the force of pneumatic air.

It is the primary object of the invention to provide a pneumatic air operated fastener driving device in which the piston is returned by the force of pneumatic air not only after completion of a full working stroke but also when the working travel of the piston is smaller than said stroke.

Another object of the invention is to provide a portable fastener device actuated by compressed air with high striking power.

A further object is to provide an extremely simple and effective mechanism for the operation of the fastener device, said mechanism comprising a minimum of elements of novel design and arrangement, suitable for economic manufacture and avoiding any excessive wear.

In accordance with these and other objects the present invention essentially comprises a main body in the shape of a handle, and a cylinder in which a piston and a driver are reciprocable. At one end this cylinder is in connection with a pneumatic air supply, and at its other end it is provided with means to limit the travel of said piston in a staple driving direction. The driver is moved through a passage of said means which passage forms a duct to exhaust air moved by said piston during its staple driving stroke. The cylinder communicates with an air chamber, from which compressed air flows beneath the piston when the latter has finished its staple driving stroke. This air returns the piston into its initial position. The piston is provided with means adapted to seal said passage of the piston travel limiting element before the piston has completed its staple driving stroke. Compressed air is then made to act upon the lower surface of the piston and causes the piston to return to retracted position where it is held by releasable means which are independent of air pressure.

Figure 2:
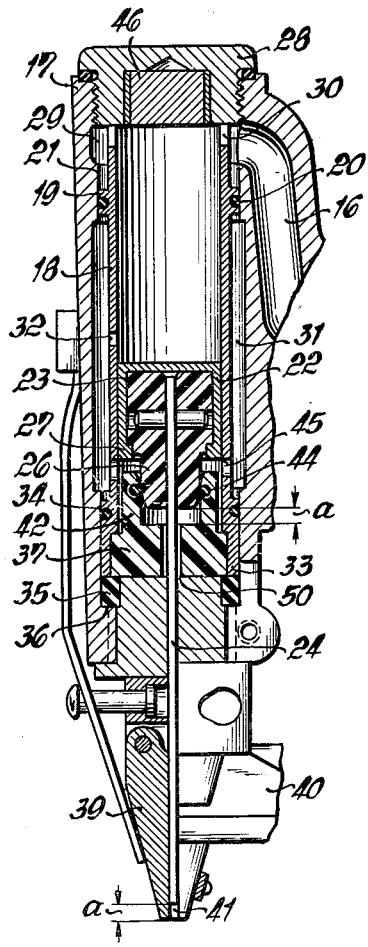
Figure 3:
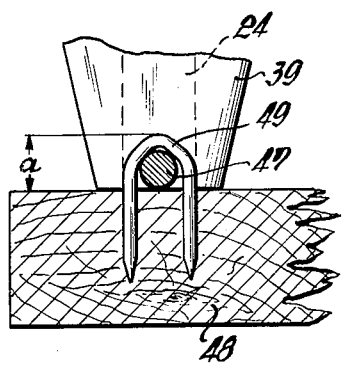

The various objects and features of the invention will be fully understood from the following description in connection with the accompanying drawings in which FIG. 1 is a fragmentary longitudinal section of a pneumatic air operated fastener driving device showing the piston in its initial position, FIG. 2 is a fragmentary and partial longitudinal section of the device of FIG. 1 showing the position of the piston at the end of a reduced working travel, FIG. 3 is a side sectional view of a portion of the structure of FIG. 1 and of a staple in a work-piece.

Referring to FIG. 1 of the drawings the device is illustrated as a portable tool which includes a main body 11 in the shape of a handle with a joint 12 to be connected to a supply of pneumatic air. Main body 11 contains a large air chamber 13 in communication with an air passage 16. Interposed between 13 and 16 is a control valve 15 which can be operated by a trigger 14. Air passage 16 extends in upward direction and ends at the top end of a cylindrical casing 17 which forms the front part of main body 11. Both parts 11 and 17 are preferably provided in one piece of light metal casting. Inserted into casing 17 is a sleeve 18 which may be made of steel, the upper portion of which has a cylindrical shoulder 19. By a sunk-in resilient ring 20 said shoulder 19 is sealed against the cylindrical internal surface of a shoulder 21 of casing 17.

Slidable in sleeve 18 is a cup shaped piston 22 which consists of a ferro-magnetic material such as steel and encloses a core 23 which may consist of a plastic material such as polyamide. Sunk into core 23 is a driver 24 which may be made of sheet steel and which is supported by a radial bolt 52 extending inside core 23. The core 23 is provided with a cylindrical depending part 26 which projects over the lower edge of piston 22 and is conically reduced towards the bottom end 25 of its surface. Core 23 is carried by a shoulder 27 of the cup shaped piston part 22.

The upper end of casing 17 is closed by a threaded cap 28. The lower edge of cap 28 and upper edge of sleeve 18 limit an annular passage 30 which forms a connection from air passage 16 to another annular air duct 29 in said casing.

The medium portion of sleeve 18 is surrounded by an air chamber 31 inside the internal wall of casing 17 which chamber is in communication with the interior of sleeve 18 by means of a port 32. Said port has a diameter of approximately 0.8 to 1 mm. and is located in the approximate middle of sleeve 18 at a point higher than the upper surface of piston 22 in the position of completion of its staple driving stroke. The lower end 33 of sleeve 18 is of same external diameter as the upper shoulder 19 and is sealed against casing 17 by a resilient ring 34. Sleeve 18 is supported by a ring 35 which may consist of an elastic material and which again is supported by a collar 36 of casing 17.

Mounted within the lower portion of sleeve 18 is a piston travel limiting element in the shape of a resilient bumper 37, the lower portion of which is of larger diameter than the upper one and is held between ring 35 and a shoulder 38 of sleeve 18. A passage 50 is arranged in said bumper. The driver 24 moves through said passage of bumper 37. The passage 50 communicates with the outside air. As heretofore practiced the driver 24 is guided in a longitudinal guideway or drive track 41 which communicates with the staple magazine 40 and is provided in the foot piece 39.

The bumper 37 at its upper end is provided with an annular collar 42, which is of same internal diameter as the depending part 26 of piston core 23 and at its upper edge has a conical extension 43. When the depending part 26 of piston core 23 enters bumper 37 it is sealed by a resilient sealing ring 44 which in the embodiment shown in the drawing is embedded in collar 42 but it may to the same advantage be provided in part 26. A plurality of openings 45 are located in sleeve 18, approximately adjacent the upper edge of collar 42 of bumper 37. The total section of openings 45 is a multiple of the section of the sole port 32.

The threaded cap 28 encloses a permanent magnet 46 which keeps piston 22 in its initial position.

The operation of the embodiment of the invention is as follows:

In its initial position piston 22 is situated as shown in FIG. 1 in which position it is held by magnet 46. When a fastener, contained in magazine 40, is intended to be driven into a work-piece through the longitudinal guideway 41, the operator squeezes trigger 14, which makes compressed air flow from air chamber 13, via air passages 16 and 30, into air duct 29 at the upper end of casing 17. When the air pressure in duct 29 is sufficient to overcome the power of magnet 46 piston 22 starts to descent and performs a working stroke by which driver 24 drives a fastener through guideway 41 and into the work-piece.

FIGURE 3 shows a staple with an angularly bent crown 49 which is used for fastening a wire 47, e.g. of a spring of a mattress, to a wooden work-piece 48, and therefore must not be fully driven into the work-piece, which means the driver 24 and piston 22 of the fastener device must be halted in their downward travel before they have completed their working stroke. The way this is accomplished is shown in FIGURE 2 which illustrates the positions of various of the staplers parts at the end of the working travel of the piston. In this position, the bottom end of driver 24 has a distance "a" from the bottom edge of foot piece 39, which equals the height of the staple projecting out of work-piece 48. The distance "a" will also be found between part 26 of piston core 23 and bumper 37 and between the lower edge of shoulder 27 of piston 22 and the upper edge of collar 42. Part 26 of piston core 23 will then have entered collar 42 of bumper 37 and be sealed by the resilient ring 44 so that the passage 50 in which the driver 24 moves is in no way connected with outside air. Thus, the compressed air which in the course of downward movement of piston 22 had entered the cylindric space inside sleeve 18 from duct 29 and passage 16, is admitted into air chamber 31 through port 32, and from there through the openings 45, it reaches the space underneath shoulder 27 of piston 22 without being able to exhaust.

In the main body 11 is provided an exhaust passage 51 leading to the outside. Said passage is in communication with the inside of sleeve 18 through air passage 16 and control valve 15 as in its initial position shown in FIG. 1. Thus, the compressed air acting on the bottom surface of shoulder 27 of piston 22 can freely move piston 22 upwards to its initial position in which it is held by the pull of magnet 46.

If driver 24 is operated to completely drive the staple into the work-piece, its bottom end is in level with the bottom edge of foot piece 39 when the working stroke of piston 22 is completed. In this position piston 22 with its lower surface 27 abuts the upper edge of collar 42 and, in so doing, raises a little, admitting compressed air from air chamber 31 and through openings 45 to underneath its lower surface 27, whereby the piston is returned into its initial position.

The construction of the fastener driving device disclosed in this specification enables reliable return of the piston by pneumatic force no matter whether the working travel of the piston completes a stroke or not. Therefore, the same device can be used both for full or partial driving of fasteners.

Having described only a typical preferred embodiment of my invention, I do not wish to be limited or restricted to the specific details herein set forth, but wish to reserve to myself any variation or modification that may appear to those skilled in the art and fall within the scope of the following claim.

I claim:

In a portable pneumatic stapler a housing body, a cylinder with an upper and lower end, means for admitting air under pressure from a source of compressed air to the upper end of said cylinder, a cup-shaped piston reciprocable in said cylinder, a driver actuated by said piston to drive a staple, an element to limit the travel of said piston in a staple driving direction located at the lower end of said cylinder, a passage in said travel limiting element, said passage forming a duct to exhaust air moved by said piston during its staple driving stroke, an air chamber enclosing said cylinder, a port in said cylinder communicating with said air chamber, openings in said cylinder adjacent said travel limiting element, a core of plastic material enclosed by said cup-shaped piston, a cylindrical continuation of said core having a smaller diameter than said cup-shaped piston, a conical reduced lower end of said core, an annular collar at the upper end of said travel limiting element, said collar having the same internal diameter as the external diameter of said continuation and a conical extension of said collar, whereby when said continuation abuts said travel limiting element said passage is sealed against the outside air before said piston has completed its working stroke.

References Cited by the Examiner

UNITED STATES PATENTS

| | | | |
|---|---|---|---|
| 1,494,030 | 5/24 | Slater | 91—399 |
| 1,132,649 | 3/15 | Brazelle | 91—399 |
| 2,802,451 | 8/57 | Chellis et al. | 91—399 |
| 2,983,922 | 5/61 | Juilfs | 91—399 |
| 3,040,709 | 6/62 | Wandel | 91—416 |

FRED E. ENGELTHALER, *Primary Examiner.*